No. 677,327. Patented June 25, 1901.
F. A. REED.
CLUTCH.
(Application filed Apr. 19, 1901.)
(No Model.)
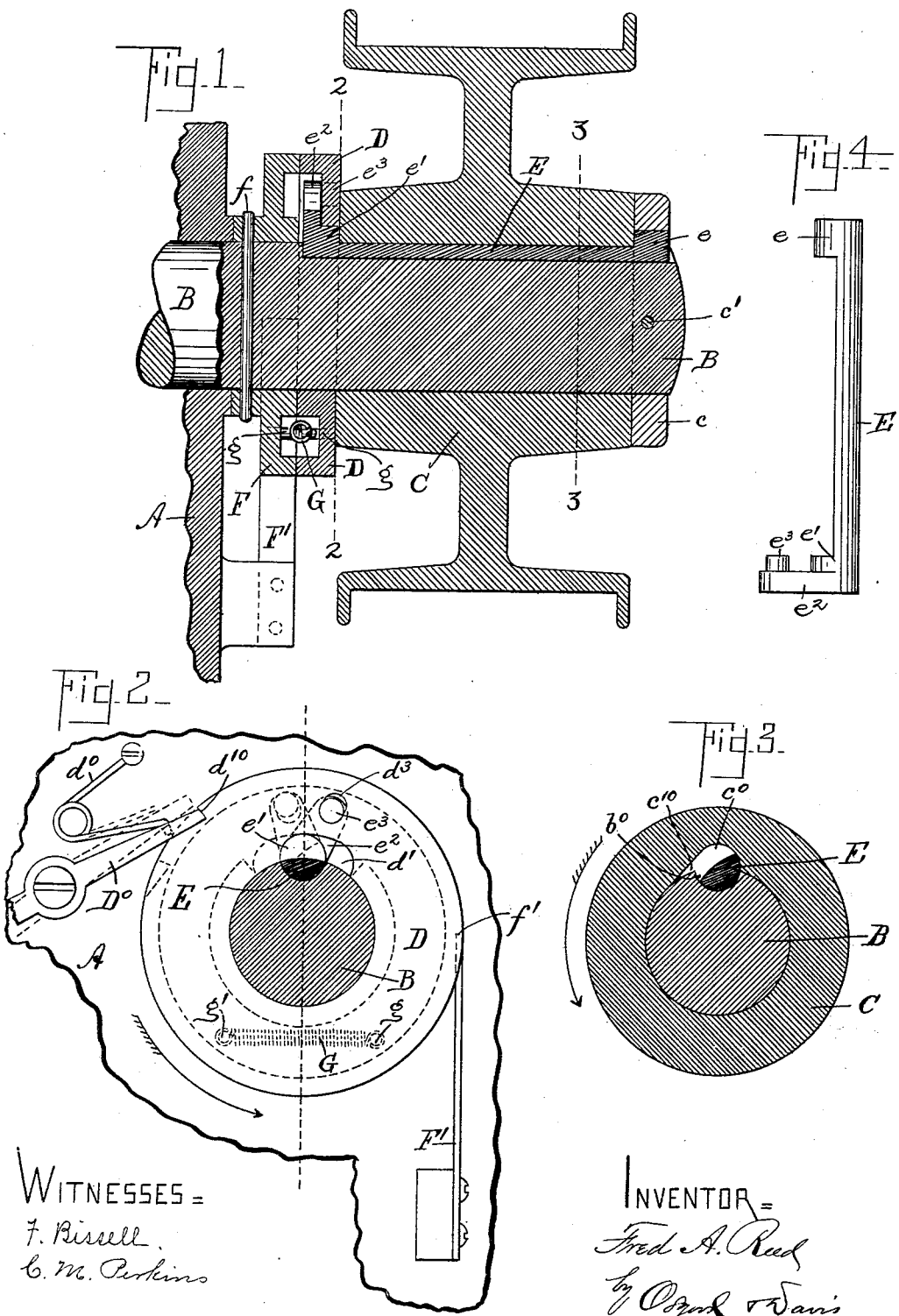

UNITED STATES PATENT OFFICE.

FRED A. REED, OF ROCHESTER, NEW YORK.

CLUTCH.

SPECIFICATION forming part of Letters Patent No. 677,327, dated June 25, 1901.

Application filed April 19, 1901. Serial No. 56,634. (No model.)

*To all whom it may concern:*

Be it known that I, FRED A. REED, a citizen of the United States, and a resident of Rochester, in the county of Monroe and State of New York, have invented certain new and useful Improvements in Clutches, of which the following is a specification.

This invention relates to clutches; and it consists in the mechanism hereinafter described and claimed.

The object of the invention is to produce an efficient clutch adapted to operate particularly with high-speed machinery.

In the drawings, Figure 1 is a longitudinal vertical central section of an embodiment of this invention. Figs. 2 and 3 are cross-sections on the lines 2 2 and 3 3, respectively, of Fig. 1; and Fig. 4 is an elevation of a detail of the mechanism.

The machine-frame A has a bearing for a shaft B or driven part. On this shaft runs a pulley C or driving part revoluble with reference to the driven part, held on the shaft on one side by a collar $c$, suitably fastened to the shaft, as by a pin $c'$. The collar $c$ holds the pulley C upon the shaft by bearing against one end of the pulley-hub. Adjacent to the other end of the pulley-hub is a flange or disk D, fitting the shaft B and capable of some rotation thereon. On the line of contact of the pulley C with the shaft B a cavity is longitudinally made, (see Fig. 3,) preferably circular in cross-section, and one half $b^0$ being in the shaft B and the other half $c^0$ being in the pulley C. In the cavity $b^0$ there rests a clutch-bar E, that is circular on one side to fit in the cavity $b^0$ and is cut away on its upper side in a curve corresponding with the contour of the shaft B, so that when the clutch-bar E is in one position, as shown in Fig. 2, the bar fills the cavity $b^0$ and has a surface continuous with the outer surface of the shaft B, so that the pulley C can revolve freely upon the shaft B. If, however, the bar E is tilted, as shown in Fig. 3, a portion of it passes into the cavity $c^0$ in the pulley C, and if the pulley is driven in the direction of the arrow shown in Fig. 3 the shaft will be driven with it. In order to permit an engagement of the bar E with the cavity in the pulley, said cavity may be cut away, as at $c^{10}$, so that the circular curvature of the cavity $c^0$ will merge into the curvature of the interior bore of the pulley and permit an easier engagement of the bar E with the pulley C.

The bar E has at one end a circular portion $e$, adapted to rest in the collar $c$, and at the other end a circular portion $e'$, adapted to rest in a corresponding cavity in the flange or ring D. The bar E also has an arm $e^2$, provided with a pin $e^3$, and said arm rests in a cavity $d$ in the flange or ring D, and said pin $e^3$ projects into a socket $d^3$ in the same flange or ring. It will now be clear that if the flange or ring D is turned through a partial revolution with reference to the shaft B the bar E will turn in its bearings $e'$ and will tilt the middle non-circular portion of the bar into the engaging position shown in Fig. 3 with the pulley C or into the releasing position shown in full lines in Fig. 2. The bearing portion $e'$ of the bar E does not rest in a circular slot in the ring D, but in an elongated slot $d'$, (shown in Fig. 2,) thereby permitting and limiting the partial revolution of the ring D with reference to the shaft B.

Besides the flange or ring D is another flange or ring F, that is fastened to the shaft in any suitable manner, such as by the pin $f$, and a spring device is provided connecting the ring F with the ring D, so as to tend to draw them to a definite position, and yet permit them to be relatively moved from such position. This spring device, as shown in Figs. 1 and 2, is a coiled spring G, connected at one end to a pin $g$, that is fixed to the ring F, and at the other end to a pin $g'$, that is fixed to the ring D. When the parts are in the position shown in full lines in Fig. 2, in which the pulley C can revolve freely upon the shaft B, the spring G is extended; but when the bar E is to be tilted into the position shown in Fig. 3 for connecting the pulley and shaft the spring G contracts quickly and causes a partial rotation of the ring D, which acts upon the pin $e^3$ and arm $e^2$ and tilts the bar E into the clutching position shown in Fig. 3. In order to produce certainty of these operations and in order to cause engagement and disengagement of the clutch mechanism, I provide a spring-catch F', attached to the frame of the machine, which is adapted to engage in a notch $f'$ in the ring F, whereby the ring F and the shaft B are prevented from backward rotation and when used in connection with another device, now to be described, hold the rings F and D in the particular position necessary for obtaining exact position of the clutch parts.

Upon the frame of the machine is a dog $D^0$, held by any suitable means, such as a spring $d^0$, so as to pass toward the periphery of the ring D, and upon the edge of said ring is a notch $d^{10}$, in which said dog engages. When the dog $D^0$ is in its notch $d^{10}$ on the flange D and the catch F' is engaged in its notch $f'$ on the ring F, the clutch-bar E is always in the position shown in Fig. 2, that enables the pulley to run freely upon the shaft; but if the dog $D^0$ is lifted out of its notch $d^{10}$ the spring G immediately pulls the ring D around with reference to the ring F, (which latter ring is held stationary for this purpose by the catch F',) the clutch-bar is tilted, and the driving-pulley engaging the bar E and pressing it against the shaft B will drive said shaft.

In order to stop the driving action, the dog $D^0$ is allowed to drop back against the rim of the ring D and in less than a single turn of the ring D will engage its notch $d^{10}$ and stop said flange. This stoppage tilts the arm $e^2$ of the clutch-bar E, so that said clutch-bar takes the position shown in Fig. 2 and instantly releases the pulley C from the shaft B. This action stretches the spring G, and the catch F' will drop into its notch $f'$.

It will be noticed that the catch F' and the dog $D^0$ are arranged to stop opposite rotations of the rings F and D.

The action of this clutch is so quick as to be substantially instantaneous. In actual practice it is adapted to connect instantaneously a pulley running at a thousand revolutions a minute with its shaft and to disconnect the parts with equal speed.

What I claim is—

1. In a clutch mechanism, a driven part, a driving part revoluble with reference to the driven part, a tilting clutch-bar carried by and resting in a longitudinal cavity in the driven part and adapted to be tilted to rest also partly in a corresponding cavity in the driving part, a ring free to revolve as to both parts and connected with the clutch-bar for tilting the same, a stop for said ring for preventing forward rotation thereof, a ring attached to the driven part and having a spring connection with the first-mentioned ring, and a stop for the second-mentioned ring for preventing backward rotation thereof, substantially as described.

2. In a clutch mechanism, a shaft, a pulley revoluble on the shaft, a tilting clutch-bar carried by and resting in a longitudinal cavity in the shaft and adapted to be tilted and to rest also partly in a corresponding cavity in the pulley, a ring free to revolve as to both shaft and pulley and connected with the clutch-bar for tilting the same, a stop for said ring for preventing forward rotation thereof, a second ring attached to the shaft and having a spring connection with the first ring and a stop for said second ring for preventing backward rotation thereof, substantially as described.

3. In a clutch mechanism, a shaft B, a pulley C revoluble on the shaft, a tilting clutch-bar E having an operating-arm $e^2$ carried by the shaft and resting in the longitudinal cavity $b^0$ in the shaft and adapted to be tilted to rest also partly in a similar cavity $c^0$ in the other part and to be tilted so as to free the bar from said pulley, a ring D free to turn as to both pulley and shaft and connected with said arm for tilting the clutch-bar, a spring-stop $D^0$ for engaging said ring for preventing forward rotation thereof, a ring F attached to the shaft, a spring G connecting said two rings, and a stop F' for the ring attached to the shaft for preventing backward rotation thereof, substantially as described.

4. In a clutch mechanism, a shaft B, a pulley C revoluble on said shaft, a tilting clutch-bar E having an operating-arm $e^2$ and carried by and resting in a longitudinal cavity $b^0$ in the shaft and adapted to be tilted to rest also partly in a corresponding cavity $c^0$ in the other part and to be tilted so as to free the bar from said pulley, a collar $c$ fastened to the shaft, a ring D free to turn as to both pulley and shaft and connected with said arm for tilting the clutch-bar, a spring-stop $D^0$ for engaging said ring for preventing backward rotation thereof, a ring F attached to the shaft, a spring G connecting said two rings, and a stop F' for the ring attached to the shaft for preventing forward rotation thereof, and a bearing for one end of the clutch-bar in said collar $e^2$ and a bearing for the other end of the clutch-bar in said ring D, substantially as described.

FRED A. REED.

Witnesses:
C. M. PERKINS,
F. BISSELL.